US010545538B2

(12) United States Patent
Jia

(10) Patent No.: US 10,545,538 B2
(45) Date of Patent: Jan. 28, 2020

(54) FOLDABLE SCREEN ASSEMBLY AND ELECTRONIC DEVICE

(71) Applicant: GUANGDONG OPPO MOBILE TELECOMMUNICATIONS CORP., LTD., Dongguan, Guangdong (CN)

(72) Inventor: Yuhu Jia, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/388,437

(22) Filed: Apr. 18, 2019

(65) Prior Publication Data

US 2019/0339742 A1 Nov. 7, 2019

(30) Foreign Application Priority Data

May 2, 2018 (CN) .......................... 2018 1 0408514
May 14, 2018 (CN) .......................... 2018 1 0455330
May 14, 2018 (CN) .......................... 2018 1 0455352

(51) Int. Cl.
G06F 1/16 (2006.01)
H04M 1/02 (2006.01)

(52) U.S. Cl.
CPC .......... *G06F 1/1652* (2013.01); *G06F 1/1681* (2013.01); *H04M 1/022* (2013.01); *H04M 1/0268* (2013.01)

(58) Field of Classification Search
CPC combination set(s) only.
See application file for complete search history.

(56) References Cited

U.S. PATENT DOCUMENTS 2,812,020 A 11/1957 Wachtendorff
2,812,805 A 11/1957 Nicholas
(Continued)

FOREIGN PATENT DOCUMENTS

CN 103914273 A 7/2014
CN 105810103 A 7/2016
(Continued)

OTHER PUBLICATIONS

International search report for Application No. PCT/CN2019/081947, dated Jul. 10, 2019 (4 pages).
(Continued)

*Primary Examiner* — Lisa Lea-Edmonds
(74) *Attorney, Agent, or Firm* — Ladas & Parry LLP

(57) ABSTRACT

A foldable screen assembly and an electronic device are disclosed. The foldable electronic device may include a shaft assembly, a support assembly, a flexible display screen, and a housing assembly. The support assembly includes a first supporting plate and a second supporting plate. The first supporting plate and the second supporting plate are rotatable along with the shaft assembly, such that the electronic device is switchable between the folded state and the unfolded state. The flexible display screen includes a first end and a second end respectively located at two opposite sides of the shaft assembly. The first end is fixedly connected to the first supporting plate, and the second end is elastically coupled to the second supporting plate. The housing assembly includes a first housing and a second housing.

20 Claims, 11 Drawing Sheets

(56) References Cited

U.S. PATENT DOCUMENTS

| | | | | |
|---|---|---|---|---|
| 6,577,496 | B1* | 6/2003 | Gioscia | G06F 1/1616 345/156 |
| 9,071,673 | B2* | 6/2015 | Choi | H04M 1/0216 |
| 9,119,316 | B2* | 8/2015 | Lee | H05K 7/16 |
| 9,204,565 | B1 | 12/2015 | Lee et al. | |
| 9,348,369 | B2* | 5/2016 | Kee | G06F 1/1616 |
| 9,348,450 | B1* | 5/2016 | Kim | G06F 1/1681 |
| 9,557,771 | B2* | 1/2017 | Park | G06F 1/1641 |
| 9,557,772 | B1* | 1/2017 | Xin | G06F 1/1647 |
| 9,874,904 | B2* | 1/2018 | Xu | G06F 1/1616 |
| 9,941,918 | B2* | 4/2018 | Kim | H04B 1/3827 |
| 9,980,373 | B2* | 5/2018 | Jeong | G05B 11/01 |
| 10,257,331 | B2* | 4/2019 | Lin | E05D 3/12 |
| 10,268,237 | B2* | 4/2019 | Lin | G06F 1/1641 |
| 10,268,244 | B2* | 4/2019 | Lin | G06F 1/1652 |
| 10,268,245 | B2* | 4/2019 | Lin | G06F 1/1652 |
| 10,274,996 | B2* | 4/2019 | Lin | G06F 1/1641 |
| 10,274,997 | B2* | 4/2019 | Lin | G06F 1/1616 |
| 10,383,241 | B2* | 8/2019 | Lin | E05D 7/00 |
| 10,394,276 | B2* | 8/2019 | Lin | G06F 1/1652 |
| 2009/0075702 | A1* | 3/2009 | Kubodera | H04M 1/022 455/566 |
| 2012/0314400 | A1* | 12/2012 | Bohn | G09F 9/301 362/97.1 |
| 2013/0010405 | A1 | 1/2013 | Rothkopf et al. | |
| 2016/0209877 | A1 | 7/2016 | Chong et al. | |
| 2017/0285691 | A1 | 10/2017 | Baek | |
| 2017/0357295 | A1 | 12/2017 | Tan et al. | |

FOREIGN PATENT DOCUMENTS

| | | |
|---|---|---|
| CN | 105825775 A | 8/2016 |
| CN | 106020361 A | 10/2016 |
| CN | 106205384 A | 12/2016 |
| CN | 106790829 A | 5/2017 |
| CN | 107135288 A | 9/2017 |
| CN | 206596050 U | 10/2017 |
| CN | 107403590 A | 11/2017 |
| EP | 2403222 A1 | 1/2012 |
| GB | 1036019 A | 7/1966 |

OTHER PUBLICATIONS

Partial European search report for Application No. EP19169151.8, dated Oct. 1, 2019 (16 pages).

* cited by examiner

FOLDABLE SCREEN ASSEMBLY AND ELECTRONIC DEVICE

CROSS REFERENCE TO RELATED APPLICATIONS

This application claims priorities to Chinese Patent Application No. 201810408514.9, filed opening on May 2, 2018, Chinese Patent Application No. 201810455352.4, filed opening on May 14, 2018, and Chinese Patent Application No. 201810455330.8, filed opening on May 14, 2018, the contents of which are herein incorporated by reference in their entireties.

TECHNICAL FIELD

The present disclosure relates to electronic devices, and in particular, to a foldable screen assembly and a foldable electronic device.

BACKGROUND

Flexible displays are bendable, such that smarts electronic devices (such as smart phones) having the flexible displays may be switchable between a folded state and an unfolded state. However, in existing designs, when the electronic devices are switched between the folded state and the unfolded state, recesses or uneven surfaces may be easily formed in partial areas of flexible display screens, and thus the display performances of the electronic device are poor.

SUMMARY

In one aspect, a foldable electronic device is disclose. The foldable electronic device may include a shaft assembly, a support assembly, a flexible display screen, and a housing assembly. The support assembly may include a first supporting plate and a second supporting plate coupled to the shaft assembly. The first supporting plate and the second supporting plate may be rotatable along with the shaft assembly, such that the electronic device is switchable between a folded state and an unfolded state. The flexible display screen may include a first end and a second end opposite to each other and respectively located at two opposite sides of the shaft assembly. The first end may be fixedly connected to the first supporting plate, and the second end may be elastically coupled to the second supporting plate. The housing assembly may include a first housing and a second housing, the first housing may be fixedly connected to the first supporting plate, and the second housing may be fixedly connected to the second supporting plate.

In another aspect, a foldable screen assembly is disclose. The foldable electronic device may include a shaft assembly, a support assembly, a flexible display screen, and a housing assembly. The support assembly may include a first supporting plate and a second supporting plate coupled to the shaft assembly. The first supporting plate and the second supporting plate may be rotatable along with the shaft assembly, such that the foldable screen assembly is switchable between a folded state and an unfolded state. The flexible display screen may include a first end and a second end opposite to each other and respectively located at two opposite sides of the shaft assembly. The first end may be fixedly connected to the first supporting plate, and the second end may be elastically coupled to the second supporting plate. The housing assembly may include a first housing and a second housing, the first housing may be fixedly connected to the first supporting plate, and the second housing may be fixedly connected to the second supporting plate.

In a further aspect, a foldable screen assembly is disclose. The foldable electronic device may include a shaft assembly, a support assembly, a flexible display screen, and a housing assembly. The support assembly may include a first supporting plate and a second supporting plate rotatably coupled to the shaft assembly. When the foldable screen assembly is in the unfolded state, the support assembly is at the same level as the shaft assembly. The first supporting plate and the second supporting plate may be rotatable along with the shaft assembly, such that the foldable screen assembly is switchable between a folded state and an unfolded state. The flexible display screen may include a first end and a second end opposite to each other and respectively located at two opposite sides of the shaft assembly. The first end may be fixedly connected to the first supporting plate, and the second end may be elastically coupled to the second supporting plate. The housing assembly may include a first housing and a second housing, the first housing may be fixedly connected to the first supporting plate, and the second housing may be fixedly connected to the second supporting plate.

DETAILED DESCRIPTION

Figure 1:
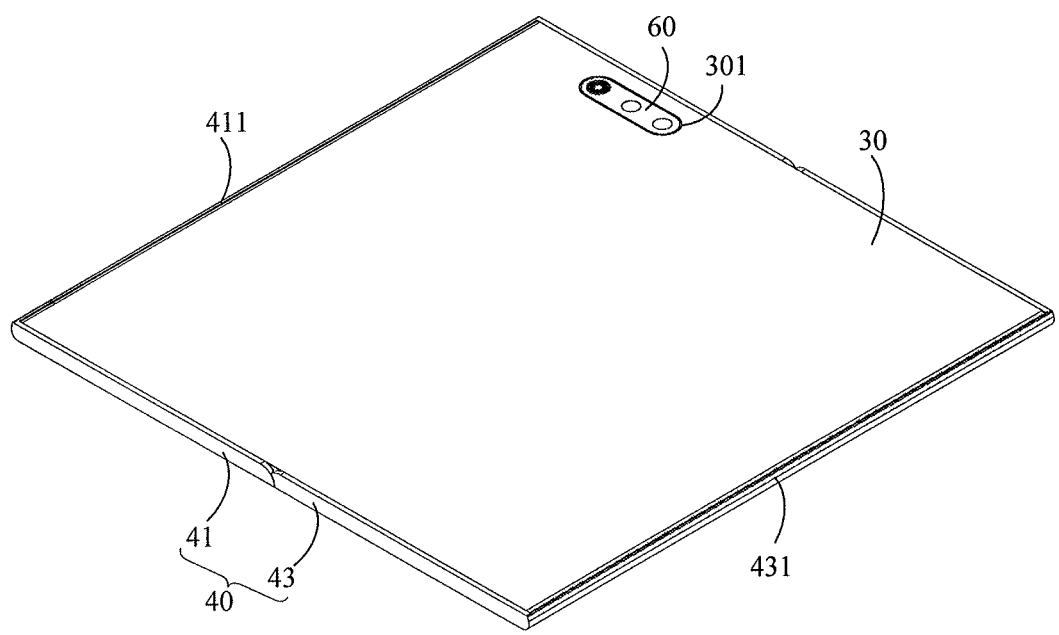
FIG. 1 is a schematic perspective structural view of a foldable electronic device in an unfolded state according to an embodiment of the present disclosure.

The technical solutions in the embodiments of the present disclosure will be clearly and completely described in detail below with reference to the accompanying drawings in the embodiments of the present disclosure. Apparently, the embodiments described herein are only some exemplary embodiments, not all the embodiments. Based on the embodiments described in the present disclosure, one skilled in the art may acquire all other embodiments without any creative efforts. All these shall be covered within the protection scope of the present disclosure.

In the description of the embodiments of the present disclosure, it should be understood that, it should be understood that, the orientation or positional relationship indicated by the terms "up", "down", "left", "right", and the like, is based on the orientation or positional relationship shown in the drawings, and is merely for convenience of description and for simplifying description, rather than implying or indicating that the device or the component must have a particular orientation or constructed and operated in a particular orientation, and thus these terms cannot to be construed as limiting the present disclosure.

In addition, terms such as "first", "second", and the like, are used herein for purposes of description, and are not intended to indicate or imply relative importance or significance or to imply the number of indicated technical features. Thus, the feature defined with "first", "second", and the like may include one or more of such a feature.

In the description of the present disclosure, "a plurality of" means two or more, unless specified otherwise. Moreover, the terms "comprise", "include" or any other variations thereof are meant to cover non-exclusive including, so that the process, method, article or device comprising a series of elements do not only include those elements, but also include other elements that are not explicitly listed or also include the inherent elements of the process, method, article or device. In the case that there are no more restrictions, an element qualified by the statement "comprises a . . . " does not exclude the presence of additional identical elements in the process, method, article or device that includes the said element.

In one aspect, a foldable electronic device is disclose. The foldable electronic device may include a shaft assembly, a support assembly, a flexible display screen, and a housing assembly. The support assembly may include a first supporting plate and a second supporting plate coupled to the shaft assembly. The first supporting plate and the second supporting plate may be rotatable along with the shaft assembly, such that the electronic device is switchable between a folded state and an unfolded state. The flexible display screen may include a first end and a second end opposite to each other and respectively located at two opposite sides of the shaft assembly. The first end may be fixedly connected to the first supporting plate, and the second end may be elastically coupled to the second supporting plate. The housing assembly may include a first housing and a second housing, the first housing may be fixedly connected to the first supporting plate, and the second housing may be fixedly connected to the second supporting plate.

In some embodiments, the foldable electronic device may further include an elastic member connected to the second end and the second supporting plate. When the electronic device is in the folded state, the elastic member may have a first elastic deformation amount. When the electronic device is in the unfolded state, the elastic member may have a second elastic deformation amount. The first elastic deformation amount may be greater than the second elastic deformation amount.

In some embodiments, a fixing post configured to position the elastic member may be further arranged on the second supporting plate. A clamping member may be disposed at the second end of the flexible display screen, and the clamping member may include a first connecting end connected to the elastic member.

In some embodiments, the elastic member may be in shape of a strip. Two opposite ends of the elastic member may be both connected to the second end, and a middle portion of the elastic member may be connected to the second supporting plate.

In some embodiments, the flexible display screen may further include a display area located between the first end and the second end. Each of the first supporting plate and the second supporting plate may include a front side and a rear side. The first housing may be located at the rear side of the first supporting plate, and the second housing may be located at the rear side of the second supporting plate. The display area may be located at the front sides respectively of the first supporting plate and the second supporting plate. The second end may be bent relative to the display area and located between the rear side of the second supporting plate and the second housing. The first end may be bent relative to the display area and located between the rear side of the first supporting plate and the first housing.

In some embodiments, the shaft assembly may include an upper surface that faces towards the display area; the first supporting plate and the second supporting plate each includes a front surface at the front side. When the electronic device is in the unfolded state, the front surface of the first supporting plate and that of the second supporting plate may be substantially flush with a line tangent to the upper surface of the shaft assembly.

In some embodiments, the foldable electronic device may further include a reinforcement assembly located between the shaft assembly and the flexible display screen. The reinforcement assembly may be slidable relative to at least one of the first supporting plate and the second supporting plate. A portion of the reinforcement assembly corresponding to the shaft assembly may be bent or flattened along with the flexible display screen.

In some embodiments, the reinforcement assembly may further include a resilient piece and a rib. The resilient piece may have two second connecting ends symmetrical about the shaft assembly when the foldable electronic device is in the unfolded state. One of the second connecting ends may be slidably connected to the first supporting plate, and the other of the second connecting ends may be slidably connected to the second supporting plate. The rib may be connected to the second connecting ends and slidable relative to the first supporting plate and the second supporting plate.

In some embodiments, the first supporting plate and the second supporting plate may each include a front surface and a rear surface opposite to the front surface. The rib may include a fixing portion and a sliding portion extending from the fixing portion, and the fixing portion may be fixedly connected to the second connecting ends. The first supporting plate and the second supporting plate may be each provided with a guiding post, the sliding portion may define a guiding hole, and the guiding post may be slidably engaged in the guiding hole. The front surfaces respectively of the first supporting plate and the second supporting plate may be each recessed toward the corresponding rear surface to form a bottom wall and two side walls. The bottom wall may be connected between the two side walls, and the bottom wall and the side walls may collectively define a reserved groove. The rib may be partially received in the reserved groove. The two side walls may each define a mounting groove. The mounting groove may communicate with the reserved groove and extend through the corresponding front surface. The first supporting plate and the second supporting plate may be each provided with a snap connected to the front surface and extending toward the mounting groove. The guiding post may span over the reserved groove, and an end portion of the guiding post may be received in the mounting groove. The snap may be configured to position the guiding post.

In some embodiments, the shaft assembly may include an intermediate rotating shaft, a first rotating shaft and a second rotating shaft parallel to each other. The first rotating shaft may abut against the first supporting plate, and the second rotating shaft may abut against the second supporting plate. The first rotating shaft and the second rotating shaft may be rotatably connected to the intermediate rotating shaft. When the foldable electronic device is in the unfolded state, the first rotating shaft and the second rotating shaft may be symmetrical about the intermediate rotating shaft.

In some embodiments, the shaft assembly may include a first mounting plate and a second mounting plate disposed symmetrical about the intermediate rotating shaft when the foldable electronic device is in the unfolded state. The first mounting plate may be fixed connected to the first rotating shaft and the first supporting plate, and the second mounting plate may be fixed connected to the second rotating shaft and the second supporting plate.

In some embodiments, the foldable electronic device may further include a first camera module, wherein the first camera module may be disposed at the first front side of the first supporting plate. A through hole may be defined in the display area of the flexible display screen, and the first camera module may be exposed out from the through hole.

In some embodiments, the foldable electronic device may further include a second camera module; wherein the first housing may include an inner surface facing towards the first supporting plate and an outer surface facing away from the first supporting plate. The second housing may include an inner surface facing towards the second supporting plate and an outer surface facing away from the second supporting plate. The second camera module may be exposed out of the outer surface of the first housing, the outer surface of the second housing may define a receiving groove, and the receiving groove may be configured to receive the second camera module when the electronic device is in the folded state.

In another aspect, a foldable screen assembly is disclose. The foldable screen assembly may be switchable between a folded state and an unfolded state. The foldable electronic device may include a shaft assembly, a support assembly, a flexible display screen, and a housing assembly. The support assembly may include a first supporting plate and a second supporting plate coupled to the shaft assembly. The first supporting plate and the second supporting plate may be rotatable along with the shaft assembly, such that the foldable screen assembly is switchable between the folded state and the unfolded state. The flexible display screen may include a first end and a second end opposite to each other and respectively located at two opposite sides of the shaft assembly. The first end may be fixedly connected to the first supporting plate, and the second end may be elastically coupled to the second supporting plate. The housing assembly may include a first housing and a second housing, the first housing may be fixedly connected to the first supporting plate, and the second housing may be fixedly connected to the second supporting plate.

In a further aspect, a foldable screen assembly is disclose. The foldable screen assembly may be switchable between a folded state and an unfolded state. The foldable electronic device may include a shaft assembly, a support assembly, a flexible display screen, and a housing assembly. The support assembly may include a first supporting plate and a second supporting plate rotatably coupled to the shaft assembly. When the foldable screen assembly is in the unfolded state, the support assembly is at the same level as the shaft assembly. The first supporting plate and the second supporting plate may be rotatable along with the shaft assembly, such that the foldable screen assembly is switchable between the folded state and the unfolded state. The flexible display screen may include a first end and a second end opposite to each other and respectively located at two opposite sides of the shaft assembly. The first end may be fixedly connected to the first supporting plate, and the second end may be elastically coupled to the second supporting plate. The housing assembly may include a first housing and a second housing, the first housing may be fixedly connected to the first supporting plate, and the second housing may be fixedly connected to the second supporting plate.

In some embodiments, the flexible display screen may further include a display area located between the first end and the second end. The first supporting plate may include a first front side and a first rear side, and the second supporting plate may include a second front side and a second rear side. The display area may be located at the first front side and the second front side. The second end is bent relative to the display area and located at the second rear side of the second supporting plate. The shaft assembly may include an upper surface that faces towards the display area; the first supporting plate may include a first front surface at the first front side, and the second supporting plate may include a second front surface at the second front side. When the electronic device is in the unfolded state, the first front surface and the second front surface may be substantially flush with a line tangent to the upper surface of the shaft assembly.

Electronic devices provided in some embodiments of the present disclosure may include, but be not limited to an apparatus receiving/transmitting communication signals via wired connection (for example, public switched telephone network (PSTN), digital subscriber line (DSL), digital cable, electric cable and/or another data connection/network), and/or via wireless connection (for example, cellular network, Wireless Area Networks (WLAN), digital television network such as DVB-H (Digital Video Broadcasting Handheld) network, satellite network, AM-FM broadcast transmitter and/or another communication terminal of wireless interface). Examples of the electronic device may include, but be not limited to, a satellite or cellular telephone; a personal communication system (PCS) terminal that can combine a cellular radio telephone with functions of data processing, fax, and data communication; a radio telephone, a pager, an internet/intranet access, a web browser, a notepad, a calendar, and/or a global positioning system (GPS) receiver personal digital assistant (PDA); and a conventional laptop, and/or a palmtop receiver or other electronic apparatuses including radio telephone transceivers.

Figure 2:
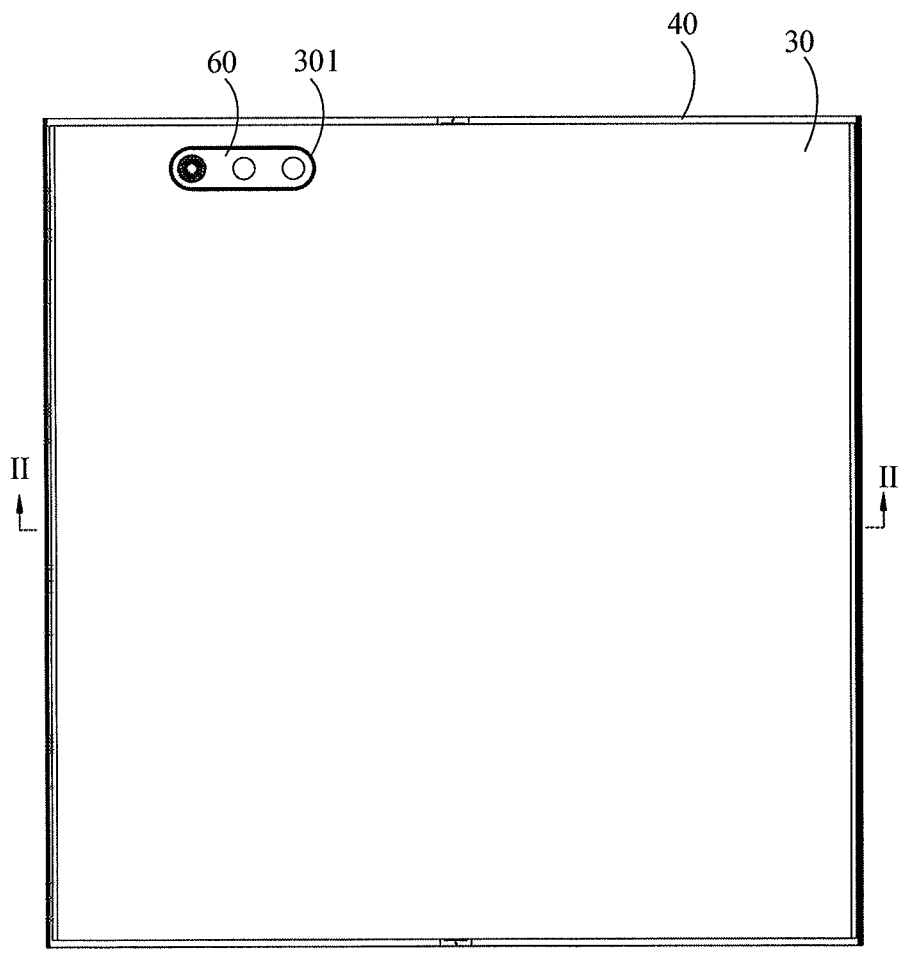
FIG. 2 is a top plan view of the foldable electronic device of FIG. 1.
Figure 3:
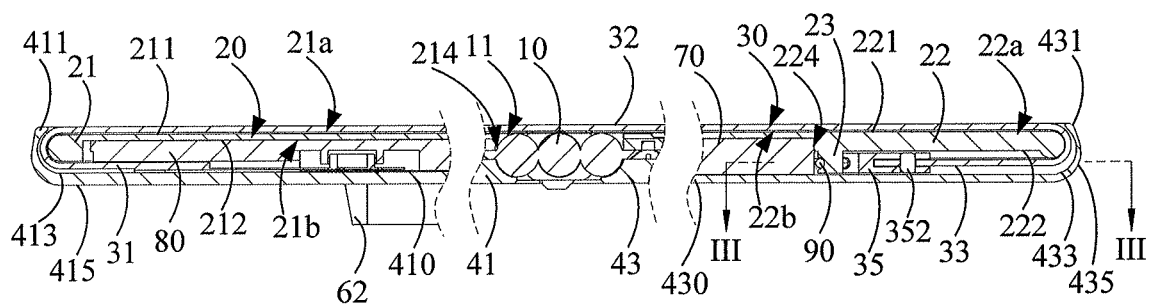
FIG. 3 is a cross-sectional view taken along line II-II of FIG. 2.
Figure 10:
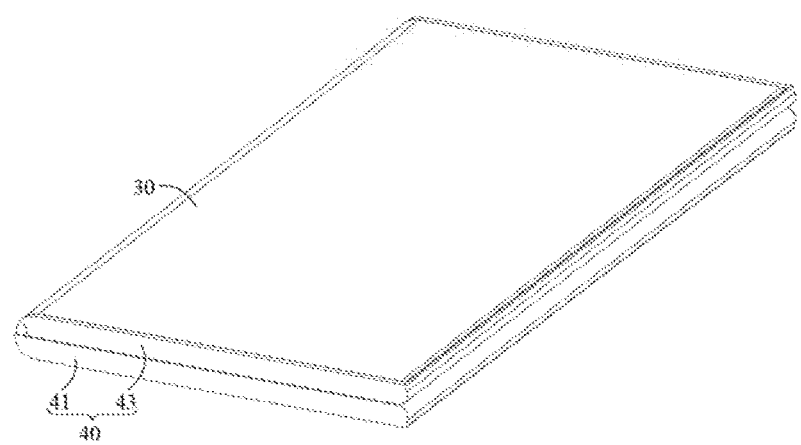
FIG. 10 is another schematic perspective structural view of the foldable electronic device in a folded state according to other embodiments of the present disclosure.

As shown in FIG. 1, FIG. 2 and FIG. 3, a foldable electronic device according to an embodiment of the present disclosure may include a foldable screen assembly and a housing assembly 40. The foldable screen assembly may include a shaft assembly 10, a support assembly 20, and a flexible display screen 30. The support assembly 20 may be coupled to the shaft assembly 10 and rotatable along with the shaft assembly 10. The flexible display screen 30 may be carried by the support assembly 20 and the shaft assembly 10, and the housing assembly 40 may be fixedly connected to the support assembly 20. As shown in FIG. 1, when the foldable electronic device is in an unfolded state, the support assembly 20 may be at a same level as the shaft assembly 10, such that the flexible display screen 30 may be unfolded and show a large display area on the same plane. When the electronic device needs to be folded, the housing assembly 40 and the support assembly 20 may be rotated about the shaft assembly 10, and further rotated to the folded state as shown in FIG. 10, such that the flexible display screen 30 may be folded in half. At this time, the flexible display screen 30 in the folded state may have a display area on the same plane less than the display area of the flexible display screen 30 in the unfolded state.

Figure 12:
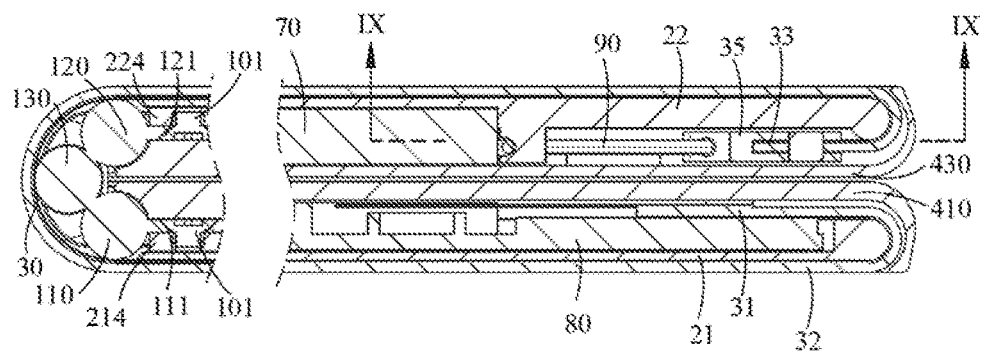
FIG. 12 is a cross-sectional view taken along line VIII-VIII of FIG. 10.

As shown in FIG. 3, the shaft assembly 10 may include a hinge structure, such as a three-axis hinge structure. When the foldable electronic device is in the unfolded state, the axes respectively of three shafts of the shaft assembly 10 may lie in the same plane. As shown in FIG. 12, when the foldable electronic device is in the folded state, the relative positions of the three shafts of the shaft assembly 10 may be changed. More specifically, the shafts at two opposite sides may be rotated about an intermediate shaft in a direction moving towards to each other. As shown in FIG. 12, the shafts on the two opposite sides may be respectively located above and below the intermediate shaft, and the shafts on both sides may be located in a same vertical plane. Besides, the cross sections respectively of the axes of the three shaft form an isosceles triangle.

Figure 5:
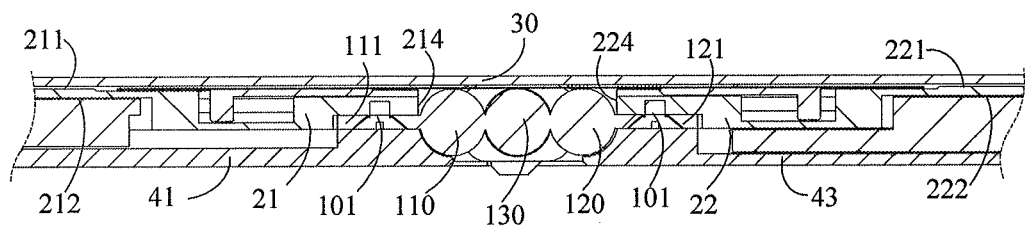
FIG. 5 is another cross-sectional view taken along line II-II of FIG. 2 according to other embodiments of the present disclosure.
Figure 6:
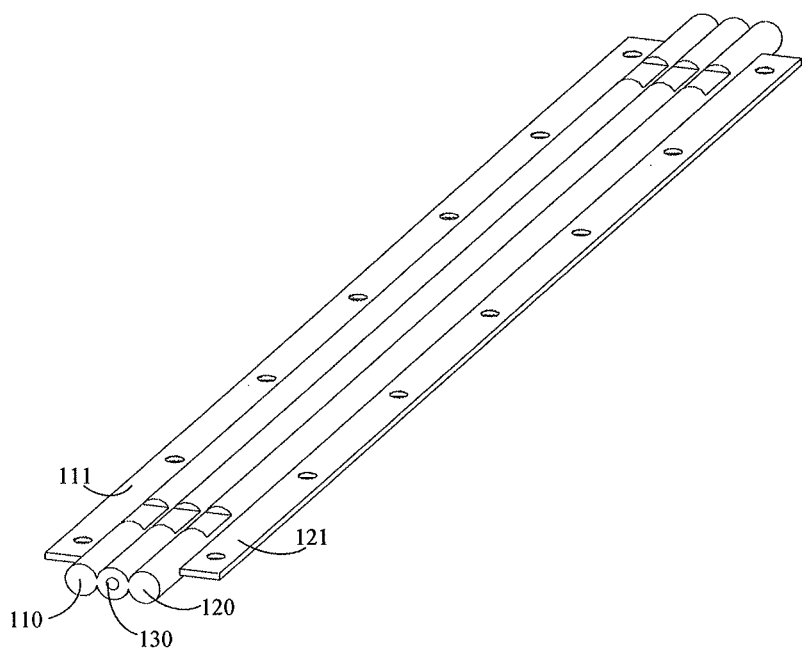
FIG. 6 is a perspective view showing the structure of the shaft assembly of FIG. 5.

More specifically, in some embodiments, as shown in FIG. 5 and FIG. 6, the shaft assembly 10 may include a first rotating shaft 110, a second rotating shaft 120, and an intermediate rotating shaft 130. The first rotating shaft 110 and the second rotating shaft 120 may be disposed at two opposite sides of the intermediate rotating shaft 130, and rotatably connected to the intermediate rotating shaft 130. When the foldable electronic device is in the unfolded state, the first rotating shaft 110 and the second rotating shaft 120 are symmetrical about the intermediate rotating shaft 130. In some embodiments, the first rotating shaft 110, the second rotating shaft 120, and the intermediate rotating shaft 130 are parallel to each other. Thus, the entire shaft assembly 10 may have a simple structure. During the movement of the shaft assembly 10, the relative position of the intermediate rotating shaft 130 may keep unchanged. For example, when the foldable electronic device is in the unfolded state, axes respectively of the first rotating shaft 110, the second rotating shaft 120, and the intermediate rotating shaft 130 may be located on the same plane. However, when the first rotating shaft 110 and the second rotating shaft 120 rotate relative to the intermediate rotating shaft 130 in a direction towards each other such that the foldable electronic device is in the folded state as shown in FIG. 12, a center of a cross section of the intermediate rotating shaft 130 may be equidistant from centers of cross sections respectively of the first rotating shaft 110 and the second rotating shaft 120. That is, lines connecting the centers of the cross sections respectively of the first rotating shaft 110, the second rotating shaft 120, and the intermediate rotating shaft 130 form an isosceles triangle. During the rotation, damping forces may be present between the first rotating shaft 110 and the intermediate rotating shaft 130, and between the second rotating shaft 120 and the intermediate rotating shaft 130. In this way, the foldable electronic device may stay at any position between the unfolded state and the folded state.

As shown in FIGS. 5 and 6, the shaft assembly 10 may further include a first mounting plate 111 and a second mounting plate 121. The first mounting plate 111 may be fixed to one of the first generatrices of the first rotating shaft 110. The first mounting plate 111 may extend along the axis of the first rotating shaft 110, and be perpendicular to a plane where the axis of the first rotating shaft 110 and the first generatrix are located. In some embodiments, the first mounting plate 111 may be integrally formed with the first rotating shaft 110. The second mounting plate 121 may be fixed to one of the second generatrices of the second rotating shaft 120. The second mounting plate 121 may extend along the axis of the second rotating shaft 120, and be perpendicular to a plane where the axis of the second rotating shaft 120 and the second generatrix are located. The second mounting plate 121 may be integrally formed with the second rotating shaft 120.

In other embodiments, the shaft assembly 10 may also be a two-axis hinge structure, or a hinge structure having more shafts. In other embodiments, the shaft assembly may also be other structures that can achieve the rotation.

As further shown in FIGS. 3 and 5, the support assembly 20 may include a first supporting plate 21 and a second supporting plate 22. The first supporting plate 21 and the second supporting plate 22 may be both connected to the shaft assembly 10. In some embodiments, the first supporting plate 21 may be connected to one shaft at one side of the shaft assembly 10 (for example, the first rotating shaft 110), and the second supporting plate 22 may be connected to another shaft at the other side of the shaft assembly 10 (for example, the second rotating shaft 120). The first supporting plate 21 and the second supporting plate 22 may be rotatable along with the corresponding shafts of the shaft assembly 10, such that the foldable electronic device may be switchable between the folded state and the unfolded state. More specifically, the first supporting plate 21 along with the shaft connected thereto (for example, the first rotating shaft 110) may be rotatable about the intermediate rotating shaft of the shaft assembly 10, and the second supporting plate 21 along with the shaft connected thereto (for example, the second rotating shaft 120) may also be rotatable about the intermediate shaft in the shaft assembly 10.

Referring back to FIG. 3, the first supporting plate 21 may include a front side 21a and a rear side 21b. More specifically, the first supporting plate 21 may include a front surface 211 at the front side 21a, a rear surface 212 at the rear side 21b, and a side surface 214 located between the front surface 211 and the rear surface 212. The second supporting plate 22 may also include a front side 22a and a rear side 22b. More specifically, the second supporting plate 22 may include a front surface 221 at the front side 22a, a rear surface 222 at the rear side 22b, and a side surface 224 located between the front surface 221 and the rear surface 222. The front surface 211 (221) may be opposite to the rear surface 212 (222). The front surface 211 (221) may be the surface that faces towards a display area of the flexible display screen 30. As shown in FIG. 3, when the foldable electronic device is in the unfolded state, the front surface 211 of the first supporting plate 21 and the front surface 221 of the second supporting plate 22 may be substantially flush with an upper tangential line of the shaft assembly 10 for better carrying the flexible display screen 30. In this way, when the foldable electronic device is in the unfolded state, the flexible display screen 30 may display contents in a relatively flat state.

Figure 9:
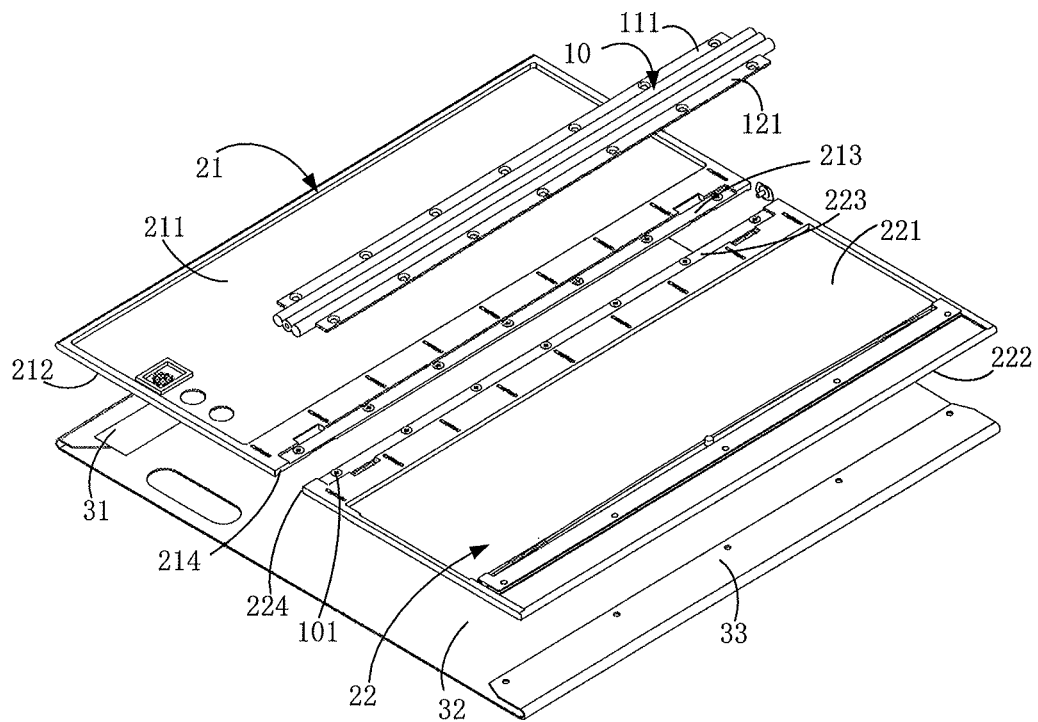
FIG. 9 is a schematic perspective structural view of the foldable electronic device in a folded state according to an embodiment of the present disclosure.

In some embodiments, as shown in FIG. 9, when the shaft assembly 10 includes a first mounting plate 111 and a second mounting plate 121, the first supporting plate 21 may be fixedly coupled to the first mounting plate 111. For example, the first supporting plate 21 and the first mounting plate 111 may be fixed by a screw 101 by means of screwing. In other embodiments, the first supporting plate 21 and the first mounting plate 111 may also be fixed in a detachable or undetachable manner by means of such as welding, engaging, riveting, gluing, and the like. Likewise, the second supporting plate 22 may be fixedly connected to the second mounting plate 121. For example, the second supporting plate 22 and the second mounting plate 121 may be fixed by the screw 101, or may also be fixed in a detachable or undetachable manner by means of such as welding, engaging, riveting, gluing, and the like.

As further shown in FIG. 9, the first supporting plate 21 may define a receiving recess 213. The receiving recess 213 may be recessed from the rear surface 212 of the first supporting plate 21 toward the front surface 211 of the first supporting plate 21 to a certain distance. At the same time, the receiving recess 213 may pass through the side surface 214 of the first supporting plate 21. The first mounting plate 111 may be fixed in the receiving recess 213. Likewise, the second supporting plate 22 may also define with a receiving recess 223, and the receiving recess 223 may be recessed from the rear surface 222 of the second supporting plate 22 toward the front surface 221 of the second supporting plate 22 to a certain distance. At the same time, the receiving recess 223 may pass through the side surface 224 of the second supporting plate 22, and the second mounting plate 121 may be fixed in the receiving recess 223.

In some embodiments, as shown in FIG. 5, the side surface 214 of the first supporting plate 21 may abut against the first rotating shaft 110, and the side surface 224 of the second supporting plate 22 may also abut against the second rotating shaft 120, such that the first supporting plate 21 may be closely attached to the first rotating shaft 110, and the second supporting plate 22 may be closely attached to the second rotating shaft 120. In this way, it is possible to reduce the gap between the first supporting plate 21 and the first rotating shaft 110, and reduce the gap between the second supporting plate 22 and the second rotating shafts 120, which in turn prevents the flexible display screen 30 from being recessed and collapsed in the gaps, thereby further ensuring the flatness of the flexible display screen 30.

In some embodiments, as shown in FIG. 3, the shaft assembly 10 may include an upper surface 11 that faces towards a display area 32 of the flexible display screen 30. Referring to FIG. 3, in some embodiments, when the foldable electronic device is in the unfolded state, the front surface 211 and the front surface 221 may be substantially flush with a line tangent to the upper surface 11 of the shaft assembly 10. In other words, the front surfaces 211, 221 respectively of the first supporting plate 21 and the second supporting plate 22 may all be located in the same plane. The first rotating shaft 110, the second rotating shaft 120, and the intermediate rotating shaft 130 may have a common tangent plane, and the front surface 211 of the first supporting plate 21 and the front surface 221 of the second supporting plate 22 may be substantially flush with the tangent plane. In this way, it is possible to ensure that the first supporting plate 21, the second supporting plate 22, the first rotating shaft 110, the second rotating shaft 120, and the intermediate rotating shaft 130 may simultaneously support the flexible display screen 30, thereby avoiding an excessive gap from being formed between the flexible display screen 30 and the shaft assembly. 10, and between the flexible display screen 30 and the support assembly 20, which in turns prevents the flexible display screen 30 from being recessed and collapsed.

Figure 7:
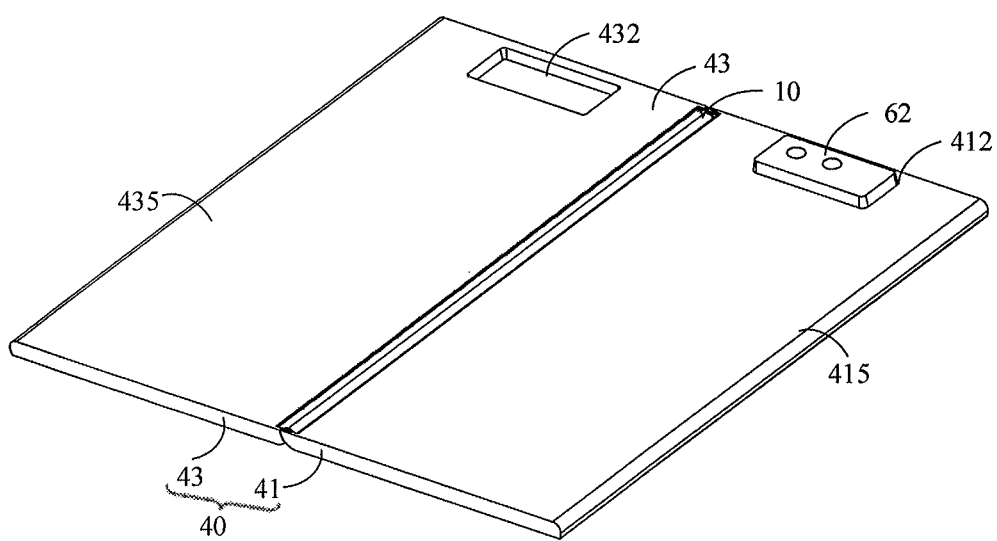
FIG. 7 is another perspective structural view of a foldable electronic device viewing in another angle according to an embodiment of the present disclosure.
Figure 8:
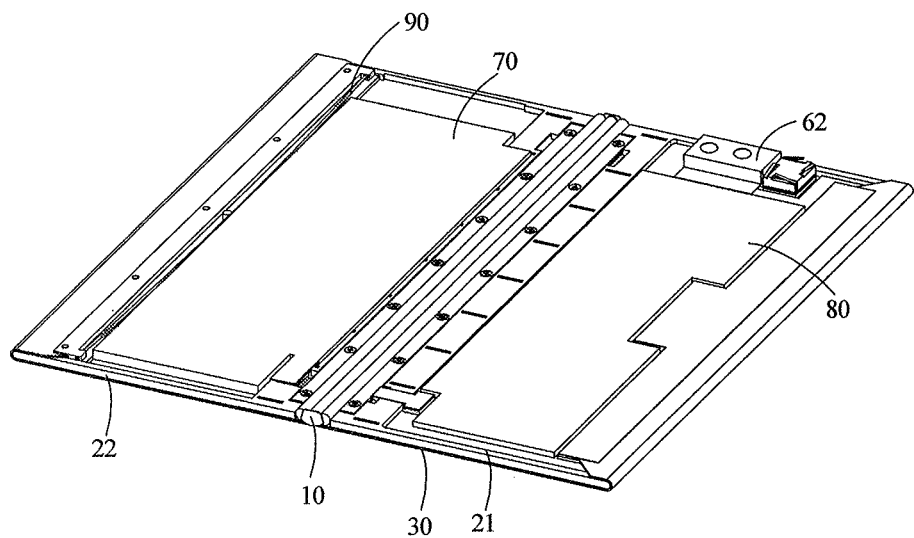
FIG. 8 is a schematic structural view of the foldable electronic device of FIG. 7 in which the housing is removed.

As shown in FIG. 1, a component, such as the first camera module 60, may be disposed on the front surface 211 at the front side 21a of the first supporting plate 21. As shown in FIG. 7 and FIG. 8, the rear surfaces 212, 222 respectively of the first supporting plate 21 and the second supporting plate 22 may further define recesses configured to receive a battery 70, a main board 80, a second camera module 62, and the like.

The flexible display screen 30 may be an OLED (Organic Light-Emitting Diode) screen configured to display information. The OLED screen may be an AMOLED (Active Matrix Organic Light Emitting Diode) screen, a Super AMOLED (Super Active Matrix Organic Light Emitting Diode) screen, or a Super AMOLED Plus (Super Active Matrix Organic Light Emitting Diode Plus) screen.

As shown in FIG. 3, the flexible display screen 30 may include a first end 31 and a second end 33 opposite to each other. The first end 31 and the second end 33 may be respectively located at two opposite sides of the shaft assembly 10. The first end 31 may be fixedly connected to the first supporting plate 21 by various methods such as bonding, riveting, welding, and the like. When the first end 31 is fixedly connected to the first supporting plate 21 by means of bonding, glue may be directly disposed between the flexible display screen 30 and the first supporting plate 21. When the first end 31 is fixedly connected to the first supporting plate 21 by means of riveting, welding, and the like, a suitable connecting member may be firstly disposed at the first end 31 of the flexible display screen 30, and the first end 31 may be further riveted, welded, and the like, to the first supporting plate 21 via the connecting member. The second end 33 may be elastically coupled to the second supporting plate 22. By elastically coupling the flexible display screen 30 to the second supporting plate 22, the flexible display screen 30 may be subjected to elastic tension when the foldable electronic device is switched between the folded state and the unfolded state. In this way, no recesses or uneven surfaces may be formed in the flexible display screen 30 during the state-switching process. In addition, when the foldable electronic device is switched between the folded state and the unfolded state, a side surface on which the flexible display screen 30 is located and a side surface on which the housing assembly 40 is located may have a difference in length. By elastically coupling the flexible display screen 30 to the second supporting plate 22, it is possible to compensate the difference in length.

Figure 4:
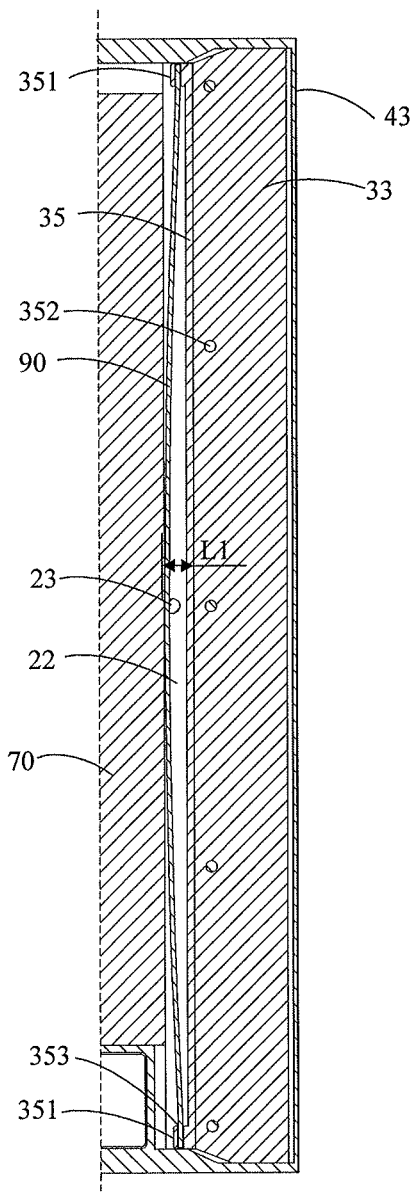
FIG. 4 is a cross-sectional view taken along line of FIG. 3.
Figure 13:
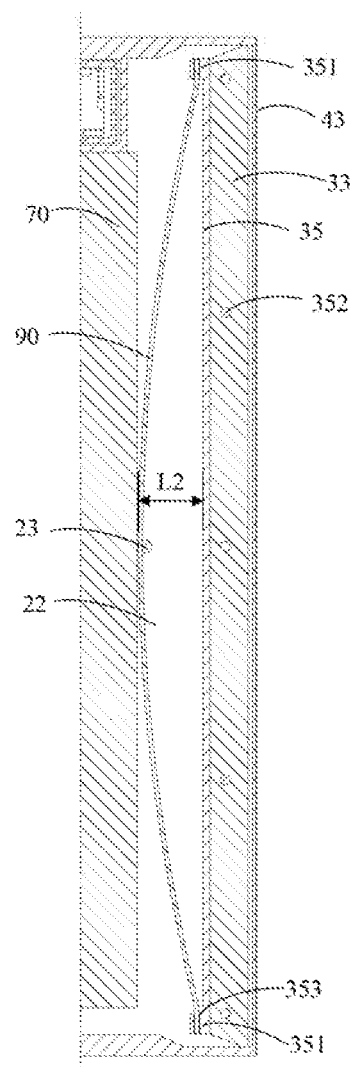
FIG. 13 is a cross-sectional view taken along line IX-IX of FIG. 11.

In an embodiment, the elastic tension between the second end 33 and the second supporting plate 22 may be achieved by arranging an elastic member 90 between the second end 33 and the second supporting plate 22. As shown in FIGS. 3-4, 8, and 13, in some embodiments, the elastic member 90 may be in shape of a strip. For example, the elastic member 90 may be an elongated member made of steel. Two opposite ends of the elastic member 90 may be connected to the second end 33, and a middle portion of the elastic member 90 may be connected to the second supporting plate 22. For example, a fixing post 23 configured to position the elastic member 90 may be arranged on the second supporting plate 22. More specifically, the middle portion of the elastic member 90 may be disposed at one side of the fixing post 23. Two opposite ends of the elastic member 90 may be connected to the second end 33 of the flexible display screen 30, and may be pulled by one side of the flexible display screen 30 that faces toward the fixing post 23. In this way, when the electronic device is switched between the folded state and the unfolded state, the elastic member 90 may be elastically deformed. As shown in FIG. 4, when the electronic device is in the unfolded state, the elastic member 90 may have an elastic deformation amount of L1. As shown in FIG. 13, when the electronic device is in the folded state, the elastic member 90 may have an elastic deformation amount of L2. In some embodiments, L2 may be greater than L1. In one embodiment, L1 may be greater than zero, that is, the elastic member 90 may also have a certain amount of deformation in the unfolded state. In this way, the flexible display screen 30 may be subjected to tension, and thus the flexible display screen 30 may not be collapsed or recessed. When the electronic device is in the folded state, the elastic member 90 may have a greater elastic deformation amount L2. In this way, the flexible display screen 30 may also be pulled at the bending portion and wrapped evenly on the shaft assembly 10. In this way, it is possible to avoid a recess from being formed when the flexible display screen 30 is bent about the shaft assembly 10.

Further, as shown in FIGS. 4 and 13, a clamping member 35 may also be disposed at the second end 33 of the flexible display screen 30. It is possible to arrange a plurality of fixing bolts 352 running through the clamping member 35 and the second end 33 of the flexible display screen 30. In this way, the clamping member 35 may be assembled to the second end 33 of the flexible display screen 30. The clamping member 35 may include a first connecting end 351 cooperating with and connected to the elastic member 90. The first connecting end 351 may further define a mating hole 353, and two ends of the elastic member 90 may be inserted into the mating hole 353.

Referring back to FIG. 3, the flexible display screen 30 may further include the display area 32 located between the first end 31 and the second end 33. The display area 32 may be located at sides at which the front surface 211 of the first supporting plate 21 and the front surface 221 of the second supporting plate 22 are located. In some embodiments, the area of the flexible display screen 30 that is exposed outside the housing assembly 40 may be the display area 32. Since the elastic member 90 is elastically coupled to the flexible display screen 30 and different amounts of elastic deformation may be generated when the electronic device is switched between the folded state and the unfolded state, the area of the flexible display screen 30 that is exposed outside the housing assembly 40 in the folded state and that in the unfolded state may be different. In other words, the areas of the display areas 32 of the flexible display screen 30 in the folded state and the unfolded state are different. Comparing FIG. 3 with FIG. 12, when the electronic device is in the unfolded state, less area of the flexible display screen 30 may be received within the housing assembly 40, such that the area of the display area 32 in the unfolded state may be greater than the area of the display area 32 in the folded state.

As shown in FIG. 1 and FIG. 2, a through hole 301 may be further defined in the display area 32 of the flexible display screen 30. The first camera module 60 may be exposed from the through hole 301. Compared with setting a cover at an edge of the flexible display screen 30 and disposing the first camera module 60 on the cover, when the first camera module 60 is exposed from the display area 32 of the flexible display screen 30, it is possible to avoid the cover from occupying more areas on the front surface of the support assembly 20. In this way, the flexible display screen 30 may have a larger display area.

As shown in FIG. 1 and FIG. 3, the housing assembly 40 may include a first housing 41 and a second housing 43. The first housing 41 may be fixedly coupled to the first supporting plate 21, for example, by means of engaging, screwing, and the like. The second housing 43 may be fixedly connected to the second supporting plate 22, for example, by means of engaging, screwing, and the like. The first housing 41 may include an inner surface 413 facing towards the first supporting plate 21 and an outer surface 415 facing away from the first supporting plate 21. The second housing 43 may include an inner surface 433 facing towards the second supporting plate 22 and an outer surface 435 facing away from the second supporting plate 22.

Figure 11:
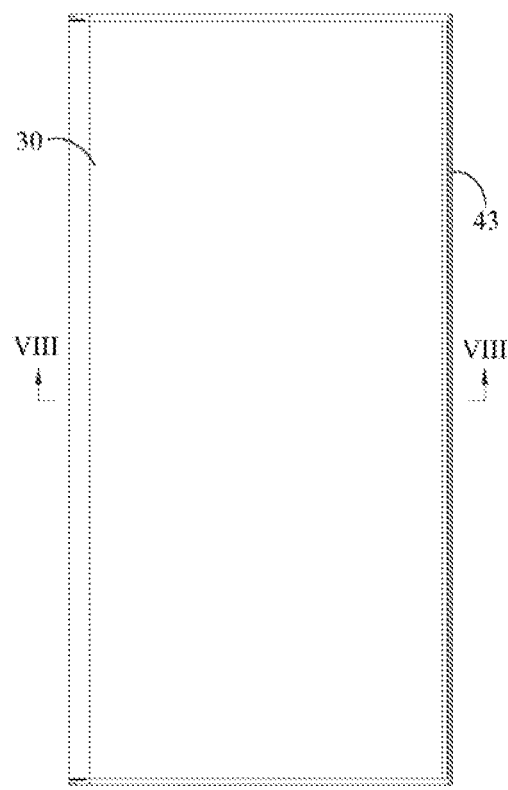
FIG. 11 is a top plan view of the foldable electronic device of FIG. 8.

More specifically, the first housing 41 may include a first bottom plate 410 and three first side walls 411 respectively extending from three edges of the first bottom plate 410. The first bottom plate 410 may be located at one side of the first supporting plate 21 at which the rear surface 212 of the first supporting plate 21 is located, that is, the first bottom plate 410 may be locate at the rear side 21b. The first side walls 411 may be located on the side surface 214 of the first supporting plate 21, such that the first housing 41 may surround the first supporting plate 21. The second housing 43 may include a second bottom plate 430 and three second side walls 431 respectively extending from three edges of the second bottom plate 430. The second bottom plate 430 may be located at one side of the second supporting plate 22 at which the rear surface 222 of the second supporting plate 22 is located, that is, the second bottom plate 430 may be locate at the rear side 22b. The second side wall 431 may be located on the side surface 224 of the second supporting plate 22, such that the second housing 43 may surround the second supporting plate 22. Edges respectively of the first bottom plate 410 and the second bottom plate 430 that have no side wall connected thereto may be configured to cooperate with the shaft assembly 10. As shown in FIG. 1, when the electronic device is in the unfolded state, the first housing 41 and the second housing 43 together form a structure in shape of an open box, in order to receive the components such as the first supporting plate 21, the second supporting plate 22, the flexible display screen 30, and the like. As shown in FIGS. 10-12, when the electronic device is in the folded state, the first bottom plate 410 of the first housing 41 and the second bottom plate 430 of the second housing 43 are stacked on one another and located inside the electronic device, such that the display area 32 of the flexible display screen 30 may be located outside of the electronic device. In actual use, the electronic device may be in an intermediate state between the folded state and the unfolded state, that is, the first bottom plate 410 may be angled from the second bottom plate 430 at an angle between 0 degrees and 180 degrees.

As shown in FIGS. 7-8, the first housing 41 may define a mounting hole 412. The second camera module 62 on the second supporting plate 22 may protrude out from the mounting hole 412 and be further exposed out of the outer surface 415 of the first housing 41. A receiving groove 432 may be recessed from the outer surface 435 of the second housing 43 in a direction towards the inner surface 433. When the foldable electronic device is in the folded state, the second camera module 62 may be received in the receiving groove 432. In some embodiments, the first camera module 60, the second camera module 62, and the main board 80 may be all disposed on the first supporting plate 21, such that the wiring configured for the communication among the first camera module 60, the second camera module 62, and the main board 80 may be simpler. At the same time, the first end 31 of the flexible display 30 may also be communicated with the main board 80.

As shown in FIGS. 3 and 12, in some embodiments, the second end 33 of the flexible display screen 30 may be bent relative to the display area 32 and located between the rear surface 222 at the rear side 22b of the second supporting plate 22 and the second housing 43. The fixing post 23 may be disposed on the rear surface 222 at the rear side 22b of the second supporting plate 22. Correspondingly, the elastic member 90 may also be located on the rear surface 222 at the rear side 22b of the second supporting plate 22 and connected between the second end 33 and the fixing post 23.

Further, the first end 31 of the flexible display screen 30 may be bent relative to the display area 32 and located between the rear surface 212 at the rear side 21b of the first supporting plate 21 and the first housing 41.

In some embodiments, both ends of the flexible display screen 30 may be bent and extend to the rear surface of the support assembly 20. In this way, the area of the flexible display screen 30 may be utilized as much as possible to display content, in order to increase the screen ratio of the electronic device. The side wall of the housing 40 may be terminated at the side surface of the support assembly 20 without extending to the front surface of the support assembly 20. It can be understood that in other embodiments, the side wall of the housing 40 may be further bent to form a cover covering the front surface of the support assembly 20. In this case, the second end 33 of the flexible display screen 30 and the elastic member 90 may be both disposed on the front surface of the support assembly 20 and blocked by the cover.

Figure 14:
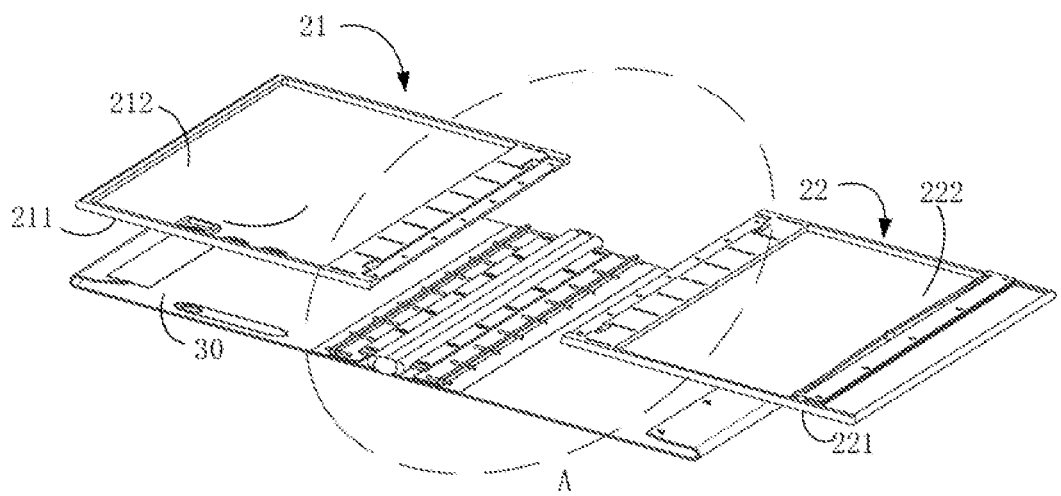
FIG. 14 is a partially exploded view of a foldable electronic device according to other embodiments of the present disclosure.
Figure 15:
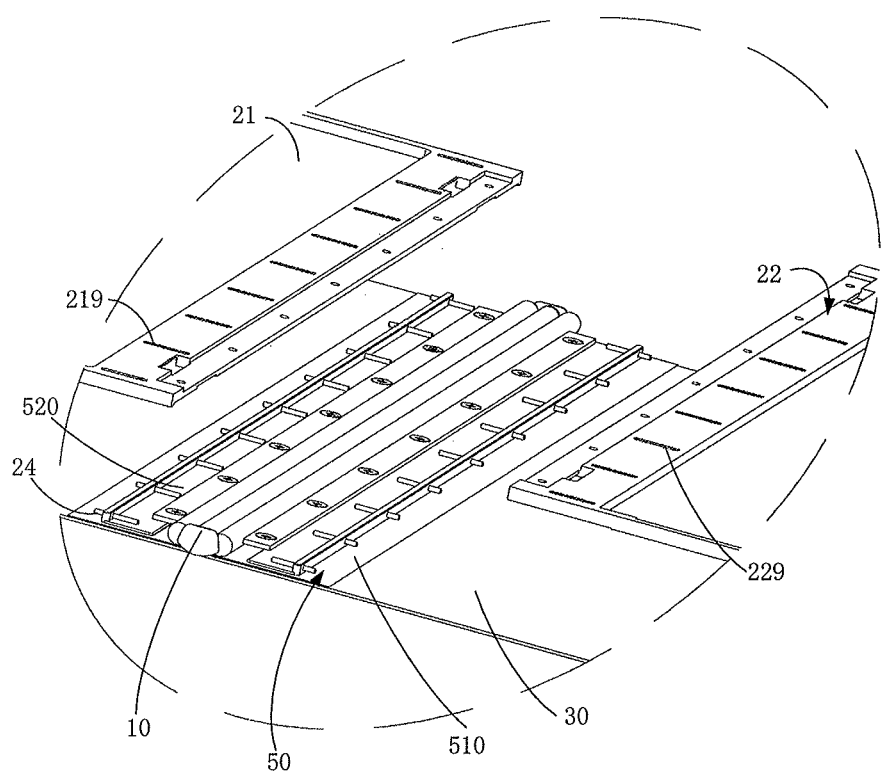
FIG. 15 is an enlarged view of the portion A shown in FIG. 14.

In other embodiments, as shown in FIGS. 14-15, the foldable screen assembly may further include a reinforcement assembly 50, and the reinforcement assembly 50 may be located between the shaft assembly 10 and the flexible display screen 30. When the foldable electronic device is in the unfolded state, the front surface 211 of the first supporting plate 21 and the front surface 221 of the second supporting plate 22 may be substantially flush with a surface of the reinforcement assembly 50 facing toward the flexible display screen 30.

Figure 16:
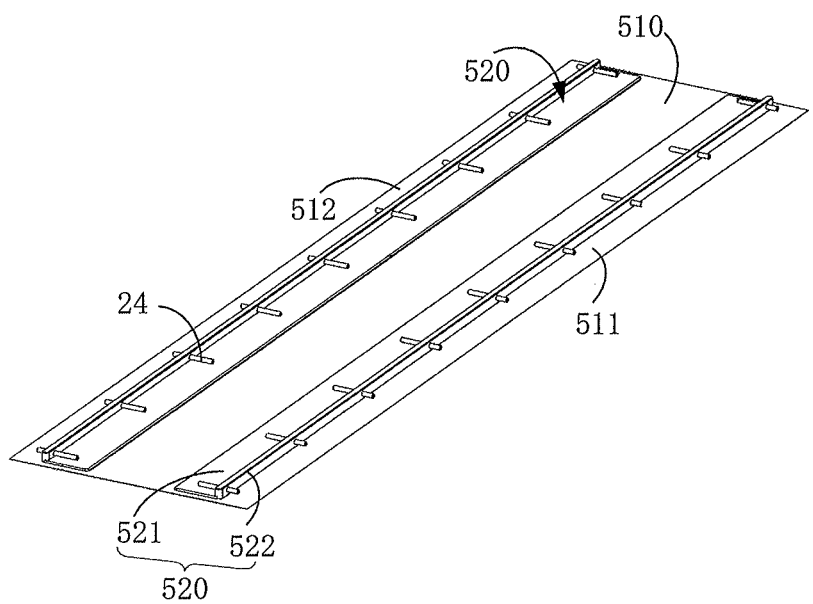
FIG. 16 is a schematic structural view of a reinforcement assembly shown in FIG. 15.

As shown in FIGS. 14-16, in some embodiments, the reinforcement assembly 50 may include a resilient piece 510. The resilient piece 510 may have a rectangular sheet shape, and may be made of nitinol material. The resilient piece 510 made of nitinol material has a unique shape-memory function, and the resilient piece 510 may produce elastic bending deformation and be bent under the action of an external force. When the external force is removed, the elastic bending deformation will no longer exist, and the resilient piece 510 may return to an initial state (for example, the flattened state) from the bending state. Even if the resilient piece 510 produces plastic bending deformation under the action of the external force, the plastic bending deformation of the resilient piece 510 may be eliminated at a certain temperature, and the resilient piece 510 may return to the initial state. This enables the resilient piece 510 to be smoothly switched between the bending state and the initial flattened state.

The resilient piece 510 has two second connecting ends 511 (512) disposed opposite to each other. When the foldable electronic device is in the unfolded state, the two second connecting ends 511 (512) are symmetrical about the shaft assembly 10. When assembling the resilient piece 510, the middle portion of the resilient piece 510 may span over the shaft assembly 10. One second connecting end 511 may be slidably connected to the first supporting plate 21, and the other second connecting end 512 may also be slidably connected to the second supporting plate 22. Of course, it may also be possible that one second connecting end 511 is fixedly (slidably) connected to the first supporting plate 21, and the other second connecting end 512 is slidably (fixed) connected to the second supporting plate 22. Optionally, it may also be possible that one second connecting end 511 is fixedly connected to the first supporting plate 21, and the other second connecting end 512 is fixedly connected to the second supporting plate 22.

Figure 21:
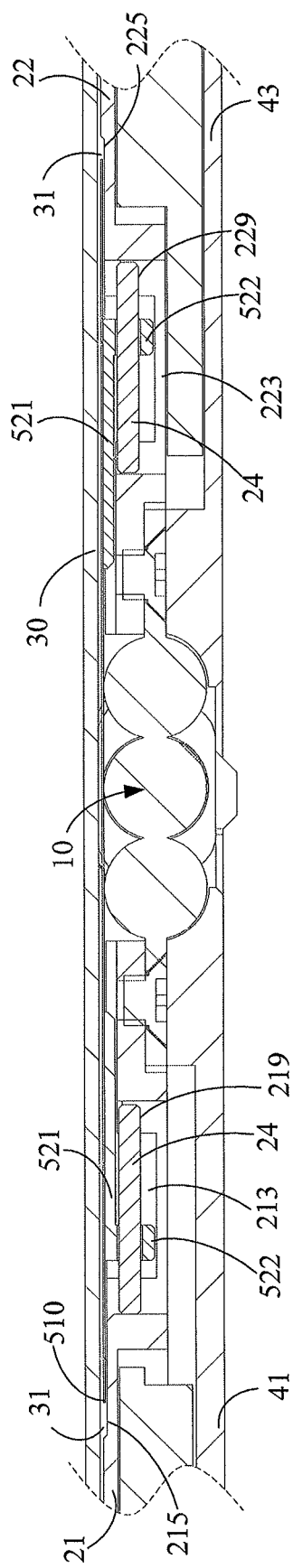
FIG. 21 is a partial cross-section view of the foldable electronic device in the unfolded state according to other embodiments of the present disclosure.
Figure 22:
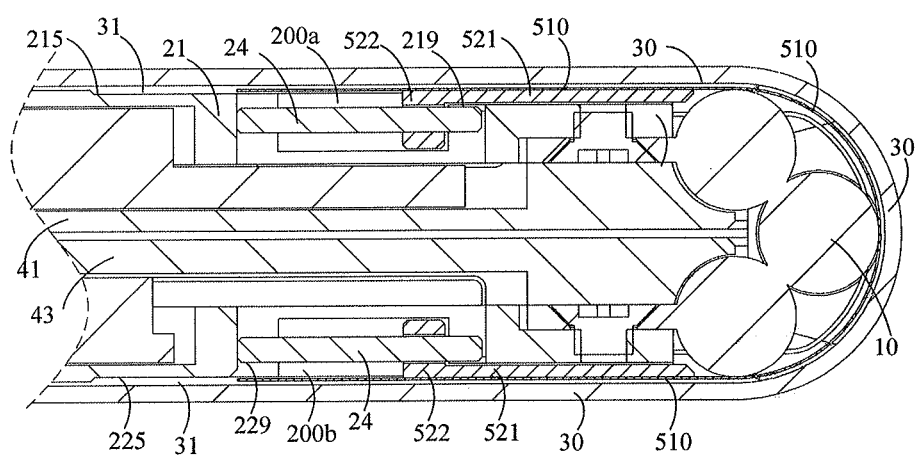
FIG. 22 is another partial cross-section view of the foldable electronic device in the folded state according to other embodiments of the present disclosure.

When the foldable electronic device is in the unfolded state, as shown in FIG. 21, the resilient piece 510 may be unfolded into a plane. The resilient piece 510 may be almost closely attached to the flexible display screen 30, and provide a certain support to the flexible display screen 30. The resilient piece 510 may separate the flexible display screen 30 from the shaft assembly 10, and be further filled in the gap between the flexible display screen 30 and the shaft assembly 10, thereby avoiding the shaft assembly 10 from failing to provide the support to the flexible display screen 30 due to an excessive gap, preventing the flexible display screen 30 from being recessed at the gap and forming a collapse, and ensuring the flatness of the flexible display screen 30. When the foldable electronic device switches from the unfolded state to the folded state, as shown in FIG. 22, the middle portion of the resilient piece 510 (that is, the portion corresponding to the shaft assembly 10) may be bent synchronously along with the flexible display screen 30. Besides, the resilient piece 510 may slide relative to at least one of the first supporting plate 21 and the second supporting plate 22 due to the bending of the resilient piece 510. The bending of the resilient piece 510 may be further applied to change the length of one side of the entire foldable electronic device at which the flexible display screen 30 is disposed during the folding process. The bent portion of the resilient piece 510 and the bent portion of the flexible display screen 30 can always form two concentrically disposed arc curved surfaces, such that the bent portions respectively of the resilient piece 510 and the flexible display screen 30 may be closely adhered to each other, and the resilient piece 510 may also separate the flexible display screen 30 from the rotating shaft, and fill the gap between the flexible display screen 30 and the rotating shaft, thereby ensuring the flatness of the flexible display screen 30. In other embodiments, the resilient piece 510 may be replaced by strip-shaped elastic strips, and the elastic strips may be spaced from each other. Two ends of each elastic strip may be respectively connected to the first supporting plate 21 and the second supporting plate 22. The elastic strips may be bent or flattened along with the flexible display screen. In this way, the resilient piece may provide an effective support to the flexible display screen 30, prevent the flexible display screen 30 from collapsing, and ensure the flatness of the flexible display screen 30.

Figure 17:
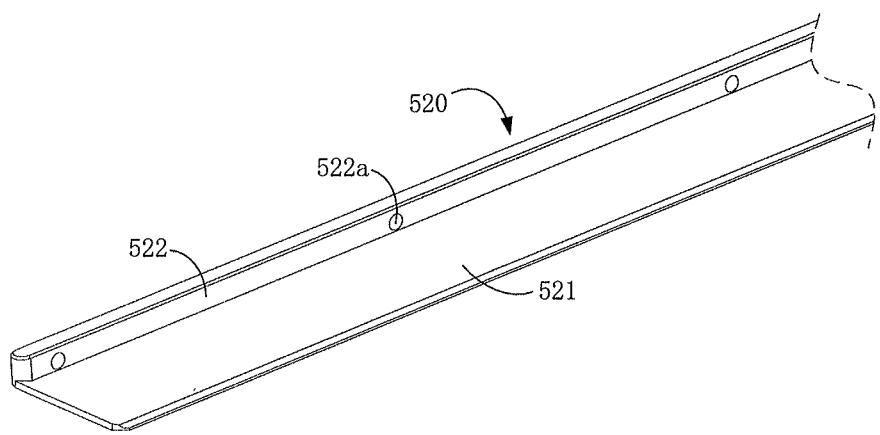
FIG. 17 is a perspective view of a rib shown in FIG. 16.

As shown in FIGS. 15-17, the reinforcement assembly 50 further may include a rib 520. The number of the rib 520 is two. The two ribs 520 may be respectively fixed on the two second connecting ends 511 (512) of the resilient piece 510, and slidably cooperate with the first supporting plate 21 and the second supporting plate 22, such that the resilient piece 510 may slide relative to the first supporting plate 21 and the second supporting plate 22. Each rib 520 may be substantially in shape of a bent plate. For example, each rib 520 may include a fixing portion 521 and a sliding portion 522. The sliding portion 522 may be bent from the fixing portion 521, such that each rib 520 may have a cross section substantially in an L shape. The fixing portion 521 may be fixedly connected to the second connecting end of the resilient piece 510, for example, by means of welding or gluing.

In some embodiments, as shown in FIGS. 15-17, the support assembly 20 may further include a guiding post 24. In this embodiments, a plurality of guiding posts 24 may be provided. The plurality of guiding posts 24 may be respectively and separately disposed on the first supporting plate 21 and the second supporting plate 22. The sliding portion 522 of each rib 520 may define a guiding hole 522a. Each guiding post 24 may be disposed in the corresponding guiding hole 522a with a certain clearance fit, such that the rib 520 may slide along the guiding posts 24 relative to the first supporting plate 21 and the second supporting plate 22. In this way, the entire reinforcement assembly 50 may be slidable relative to the support assembly 20.

Figure 18:
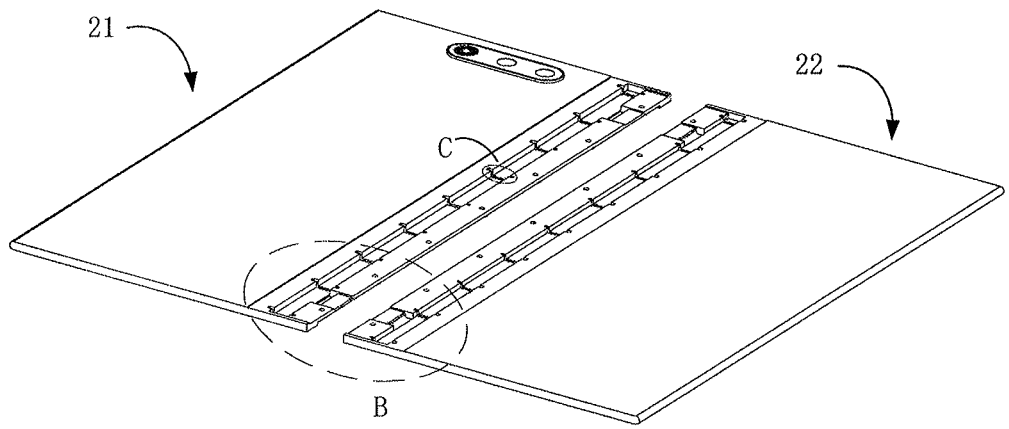
FIG. 18 is a schematic structural view of a support assembly in the foldable electronic device according to some embodiments of the present disclosure.
Figure 19:
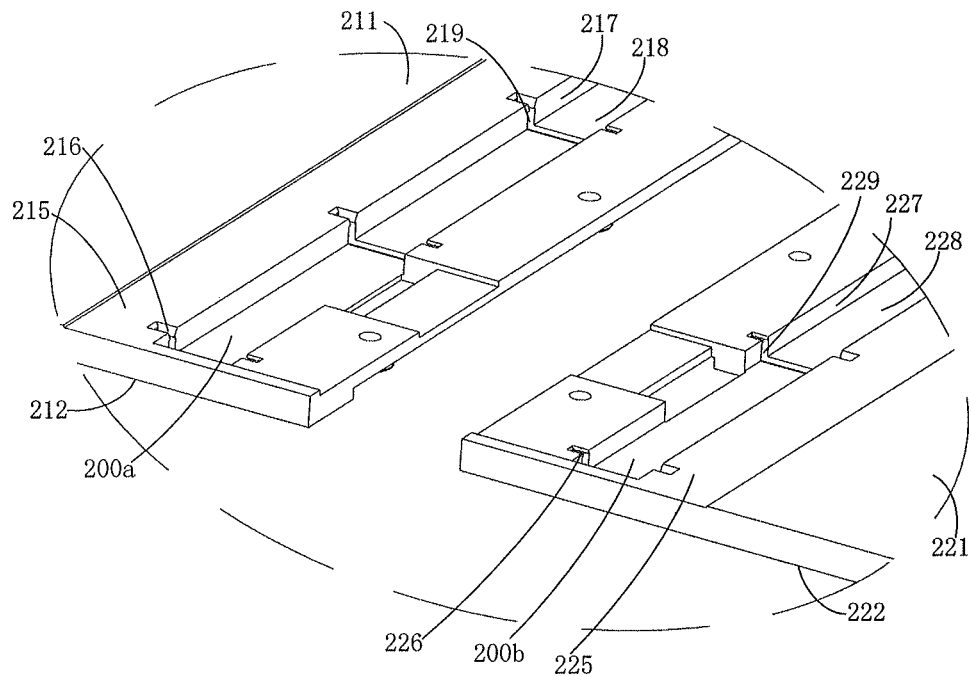
FIG. 19 is an enlarged view of the portion B shown in FIG. 18.
Figure 20:
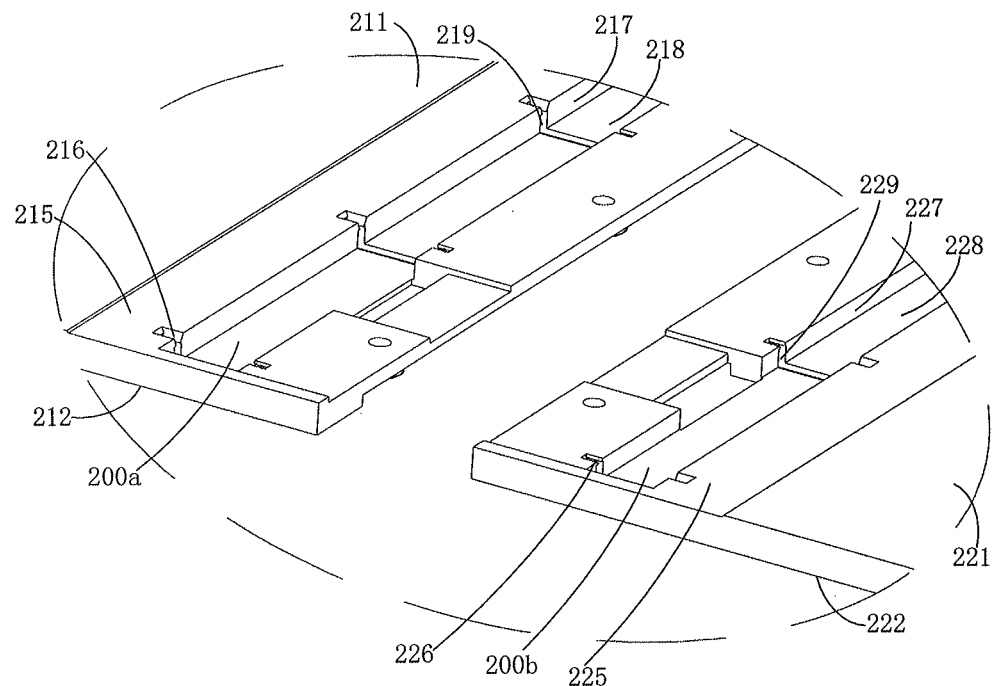
FIG. 20 is an enlarged view of the portion C shown in FIG. 18.

As shown in FIGS. 18-20, the front surface 211 of the first supporting plate 21 may be recessed toward the rear surface 212 of the first supporting plate 21 to form a bottom wall 218 and two third side walls 217. The two third side walls 217 may be disposed opposite to each other, and the bottom wall 218 may be connected between the two third side walls 217. The third side walls 217 and the bottom wall 218 may together define a reserved groove 200a. Similarly, the front surface 221 of the second supporting plate 22 may be recessed toward the rear surface 222 to form a bottom wall 228 and two fourth side walls 227. The two fourth side walls 227 may be disposed opposite to each other, and the bottom wall 228 may be connected between the two fourth side walls 227. The two fourth side walls 227 and the bottom wall 228 may together define a reserved groove 200b. The sliding portion 522 of the ribs 520 may be received in the reserved groove 200a (200b) to eliminate interference existed when the ribs 520 are sliding relative to the first supporting plate 21 and the second supporting plate 22. In this way, it is possible to ensure that the resilient piece 510 may be synchronously bent or flattened along with the flexible display screen 30. Therefore, the resilient piece 510 may provide an effective support to the flexible display screen 30, thereby preventing the flexible display screen 30 from collapsing.

As shown in FIGS. 18-20, the two third side walls 217 of the first supporting plate 21 may define a mounting groove 219. The mounting groove 219 may communicate with the reserved groove 200a and extend through the front surface 211 of the first supporting plate 21. A snap 216 may be disposed on the first supporting plate 21. The snap 216 may be connected to the front surface 211 and extend a reasonable length into the mounting groove 219. The two fourth side walls 227 of the second supporting plate 22 may also define a mounting groove 229. The mounting groove 229 may communicate with the reserved groove 200b and extend through the front surface 221 of the second supporting plate 22. A snap 226 may be disposed on the second supporting plate 22. The snap 226 may be connected to the front surface 221 and extend a reasonable length into the mounting groove 229. The middle portion of the guiding post 24 may span over the reserved grooves 200a and 200b. That is to say, a projection of the middle portion of the guiding post 24 on the first supporting plate 21 may be located in the reserved grooves 200a and 200b. End portions respectively of the guiding post 24 may be received in the mounting grooves 219 and 229. The snap 216 (226) may position and support the guiding post 24, and thus the guiding post 24 will not shake in the mounting groove 219 (229). When the guiding post 24 passes through the guiding hole 522a on the rib 520, it is possible to ensure the sliding accuracy of the rib 520 along the extension direction of the guiding post 24, in order to mate with smooth bending of the resilient piece 510. During installation, the guiding post 24 may be firstly sleeved in the guiding hole 522a, and the end portions of the guiding post 24 may be snapped into the mounting groove 219 (229) via the snap 216 (226). In other embodiments, the mounting groove 219 (229) may also extend through the front surface 211 (221) and the bottom wall 218 (228) at the same time, that is, the mounting groove 219 (229) may be a through groove. The through groove may simultaneously extend through the front surface 211 (221) and the rear surface 212 (222), and cut the bottom wall 218 (228) of the reserved groove 200a (223).

As shown in FIG. 22, when the foldable electronic device is changed from the unfolded state to the folded state, the sliding portion 522 of the rib 520 may slide along the guiding post 24 in a direction toward the shaft assembly 10, such that the resilient piece 510 may be gradually bent along with the flexible display screen 30. As shown in FIG. 21, when the foldable electronic device is changed from the folded state to the unfolded state, the sliding portion 522 of the rib 520 may slide along the guiding post 24 in a direction away from the shaft assembly 10, and the resilient piece 510 may be gradually flatten along with the flexible display screen 30. In this way, the resilient piece 510 may be driven by the ribs 520 to slide away from or close to the shaft assembly 10, such that the resilient piece 510 may be successfully bent or flattened. In this way, it is possible to ensure that the elastic strip may be bent or flattened along with the flexible display screen 30, thereby providing an effective support to the flexible display screen 30, preventing the flexible display screen 30 from collapsing, and ensuring the flatness of the flexible display screen 30.

As shown in FIGS. 19-20, the first supporting plate 21 may define a recessed part 215. The recessed part 215 may be recessed to a preset depth from the front surface 211 toward the rear surface 212 at a position of the first supporting plate 21 that is adjacent to the shaft assembly 10. Likewise, the second supporting plate 22 may also define a recessed part 225. The recessed parts 215 and 225 respectively of the first supporting plate 21 and the second supporting plate 22 may be collectively disposed with the flexible display screen 30 to define a gap 310 of a set width. That is to say, the flexible display screen 30 may span over the first supporting plate 21 and the second supporting plate 22, such that the gap 310 may be formed by recessed parts 215 and 225 respectively of the first supporting plate 21 and the second supporting plate 22 and the flexible display screen 300. A portion of the resilient piece 510 may be received in the gap 310, so as to provide a movement space for the sliding of the resilient piece 510 relative to the first supporting plate 21 and the second supporting plate 22. In some embodiments, the reserved grooves 200a (200b) may be defined in the bottom wall of the recessed part 215 (225). When the foldable electronic device is changed from the unfolded state to the folded state, the resilient piece 510 may be gradually bent, and the end portions of the resilient piece 510 may slide in a direction close to the shaft assembly 10. At this time, a length of the portion of the resilient piece 510 that is received in the gap 310 may be gradually reduced, and the reduced portion may compensate for the increase size due to the bending of the resilient piece 510 as shown in FIG. 22. On the contrary, when the foldable electronic device is changed from the folded state to the unfolded state, as shown in FIG. 21, the resilient piece 510 may be gradually flattened and the end portions of the resilient piece 510 may slide in a direction away from the shaft assembly 10. At this time, the length of the portion of the resilient piece 510 that is received in the gap 310 may be gradually increased. Therefore, the portion of the resilient piece 510 received in the gap 310 may have a length in the unfolded state greater than that in the folded state.

The technical features of the above-described embodiments may be combined in any combination. For brief description, not all possible combinations of the technical features in the above embodiments are described. However, all the combination should be considered as the scope of this specification, as long as there is no confliction is generated between the combinations of these technical features.

The above embodiments are merely illustrative of several embodiments of the present disclosure, and the description thereof is more specific and detailed. However, it should not be construed as limiting the scope of the present disclosure. It should be noted, those skilled in the art can also make several modifications and improvements without departing from the principles of the present disclosure. All these shall be covered within the protection scope of the present disclosure. Therefore, the scope of the present disclosure should be determined by the appended claims.

What is claimed is:

1. A foldable electronic device, comprising:
 a shaft assembly;
 a support assembly, comprising a first supporting plate and a second supporting plate coupled to the shaft assembly; the first supporting plate and the second supporting plate being rotatable along with the shaft assembly, such that the electronic device is switchable between a folded state and an unfolded state;
 a flexible display screen, comprising a first end and a second end opposite to each other and respectively located at two opposite sides of the shaft assembly; the first end being fixedly connected to the first supporting plate, and the second end being elastically coupled to the second supporting plate; and
 a housing assembly, comprising a first housing and a second housing, the first housing being fixedly connected to the first supporting plate, and the second housing being fixedly connected to the second supporting plate.

2. The foldable electronic device of claim 1, further comprising an elastic member connected to the second end and the second supporting plate; wherein when the electronic device is in the folded state, the elastic member has a first elastic deformation amount; when the electronic device is in the unfolded state, the elastic member has a second elastic deformation amount; the first elastic deformation amount is greater than the second elastic deformation amount.

3. The foldable electronic device of claim 2, wherein a fixing post configured to position the elastic member is further arranged on the second supporting plate; a clamping member is disposed at the second end of the flexible display screen, and the clamping member comprises a first connecting end connected to the elastic member;
 or the elastic member is in shape of a strip; two opposite ends of the elastic member are both connected to the second end, and a middle portion of the elastic member is connected to the second supporting plate.

4. The foldable electronic device of claim 1, wherein the flexible display screen further comprises a display area located between the first end and the second end; each of the first supporting plate and the second supporting plate comprises a front side and a rear side;
 the first housing is located at the rear side of the first supporting plate, and the second housing is located at the rear side of the second supporting plate;
 the display area is located at the front sides respectively of the first supporting plate and the second supporting plate; the second end is bent relative to the display area and located between the rear side of the second supporting plate and the second housing; the first end is bent relative to the display area and located between the rear side of the first supporting plate and the first housing.

5. The foldable electronic device of claim 4, wherein the shaft assembly comprises an upper surface that faces towards the display area; the first supporting plate and the second supporting plate each comprises a front surface at the front side;
 when the electronic device is in the unfolded state, the front surface of the first supporting plate and that of the second supporting plate are substantially flush with a line tangent to the upper surface of the shaft assembly.

6. The foldable electronic device of claim 1, further comprising a reinforcement assembly located between the shaft assembly and the flexible display screen, wherein the reinforcement assembly is slidable relative to at least one of the first supporting plate and the second supporting plate; a portion of the reinforcement assembly corresponding to the shaft assembly is bent or flattened along with the flexible display screen.

7. The foldable electronic device of claim 6, wherein the reinforcement assembly comprises:
 a resilient piece, having two second connecting ends symmetrical about the shaft assembly when the foldable electronic device is in the unfolded state; wherein one of the second connecting ends is slidably connected to the first supporting plate, and the other of the second connecting ends is slidably connected to the second supporting plate; and
 a rib, connected to the second connecting ends and slidable relative to the first supporting plate and the second supporting plate.

8. The foldable electronic device of claim 7, wherein the first supporting plate and the second supporting plate each comprises a front surface and a rear surface opposite to the front surface;
 the rib comprises a fixing portion and a sliding portion extending from the fixing portion, and the fixing portion is fixedly connected to the second connecting ends; the first supporting plate and the second supporting plate each is provided with a guiding post, the sliding portion defines a guiding hole, and the guiding post is slidably engaged in the guiding hole;

the front surfaces respectively of the first supporting plate and the second supporting plate are each recessed toward the corresponding rear surface to form a bottom wall and two side walls; the bottom wall is connected between the two side walls, and the bottom wall and the side walls collectively define a reserved groove; the rib is partially received in the reserved groove;

the two side walls each defines a mounting groove; the mounting groove communicates with the reserved groove and extends through the corresponding front surface; the first supporting plate and the second supporting plate are each provided with a snap connected to the front surface and extending toward the mounting groove, the guiding post spans over the reserved groove, and an end portion of the guiding post is received in the mounting groove; the snap is configured to position the guiding post.

9. The foldable electronic device of claim 1, wherein the shaft assembly comprises an intermediate rotating shaft, a first rotating shaft and a second rotating shaft parallel to each other; the first rotating shaft abuts against the first supporting plate, and the second rotating shaft abuts against the second supporting plate;

the first rotating shaft and the second rotating shaft are rotatably connected to the intermediate rotating shaft; when the foldable electronic device is in the unfolded state, the first rotating shaft and the second rotating shaft are symmetrical about the intermediate rotating shaft.

10. The foldable electronic device of claim 9, wherein the shaft assembly further comprises a first mounting plate and a second mounting plate disposed symmetrical about the intermediate rotating shaft when the foldable electronic device is in the unfolded state; the first mounting plate is fixed connected to the first rotating shaft and the first supporting plate, and the second mounting plate is fixed connected to the second rotating shaft and the second supporting plate.

11. A foldable screen assembly, comprising:
a shaft assembly;
a support assembly, comprising a first supporting plate and a second supporting plate coupled to the shaft assembly; the first supporting plate and the second supporting plate being rotatable along with the shaft assembly such that the foldable screen assembly is switchable between a folded state and an unfolded state; wherein when the foldable screen assembly is in the unfolded state, the support assembly is at the same level as the shaft assembly;
a flexible display screen, comprising a first end and a second end opposite to each other and respectively located at two opposite sides of the shaft assembly; the first end being fixedly connected to the first supporting plate, and the second end being elastically coupled to the second supporting plate; and
a housing assembly, comprising a first housing and a second housing, the first housing being fixedly connected to the first supporting plate, and the second housing being fixedly connected to the second supporting plate.

12. The foldable screen assembly of claim 11, further comprising an elastic member connected to the second end and the second supporting plate; wherein when the foldable screen assembly is in the folded state, the elastic member has a first elastic deformation amount; when the foldable screen assembly is in the unfolded state, the elastic member has a second elastic deformation amount; the first elastic deformation amount is greater than the second elastic deformation amount.

13. The foldable screen assembly of claim 12, wherein a fixing post configured to position the elastic member is further arranged on the second supporting plate; a clamping member is disposed at the second end of the flexible display screen, and the clamping member comprises a first connecting end connected to the elastic member;

or the elastic member is in shape of a strip; two opposite ends of the elastic member are connected to the second end, and a middle portion of the elastic member is connected to the second supporting plate.

14. The foldable screen assembly of claim 12, wherein the flexible display screen further comprises a display area located between the first end and the second end; each of the first supporting plate and the second supporting plate comprises a front side and a rear side;

the first housing is located at the rear side of the first supporting plate, and the second housing is located at the rear side of the second supporting plate;

the display area is located at the front sides respectively of the first supporting plate and the second supporting plate; the second end is bent relative to the display area and located between the rear side of the second supporting plate and the second housing; the first end is bent relative to the display area and located between the rear side of the first supporting plate and the first housing.

15. The foldable screen assembly of claim 14, wherein the shaft assembly comprises an upper surface that faces towards the display area; the first supporting plate and the second supporting plate each comprises a front surface at the front side;

when the foldable screen assembly is in the unfolded state, the front surface of the first supporting plate and that of the second supporting plate are substantially flush with a line tangent to the upper surface of the shaft assembly.

16. The foldable screen assembly of claim 11, further comprising a reinforcement assembly located between the shaft assembly and the flexible display screen, wherein the reinforcement assembly is slidable relative to at least one of the first supporting plate and the second supporting plate; a portion of the reinforcement assembly corresponding to the shaft assembly is bent or flattened along with the flexible display screen;

the reinforcement assembly comprises:
a resilient piece, having two second connecting ends symmetrical about the shaft assembly when the foldable screen assembly is in the unfolded state; wherein one of the second connecting ends is slidably connected to the first supporting plate, and the other of the second connecting ends is slidably connected to the second supporting plate; and
a rib, connected to the second connecting ends and slidable relative to the first supporting plate and the second supporting plate.

17. The foldable screen assembly of claim 16, wherein the first supporting plate and the second supporting plate each comprises a front surface and a rear surface opposite to the front surface;

the rib comprises a fixing portion and a sliding portion extending from the fixing portion, and the fixing portion is fixedly connected to the second connecting ends; the first supporting plate and the second supporting plate each is provided with a guiding post, the sliding portion defines a guiding hole, and the guiding post is slidably engaged in the guiding hole;

the front surfaces respectively of the first supporting plate and the second supporting plate are each recessed toward the corresponding rear surface to form a bottom wall and two side walls; the bottom wall is connected between the two side walls, and the bottom wall and the side walls collectively define a reserved groove; the rib is partially received in the reserved groove;

the two side walls each defines a mounting groove; the mounting groove communicates with the reserved groove and extends through the corresponding front surface; the first supporting plate and the second supporting plate are each provided with a snap connected to the front surface and extending toward the mounting groove, the guiding post spans over the reserved groove, and an end portion of the guiding post is received in the mounting groove; the snap is configured to position the guiding post.

18. The foldable screen assembly of claim 11, wherein the shaft assembly comprises an intermediate rotating shaft, a first rotating shaft and a second rotating shaft parallel to each other; the first rotating shaft abuts against the first supporting plate, and the second rotating shaft abuts against the second supporting plate;

the first rotating shaft and the second rotating shaft are rotatably connected to the intermediate rotating shaft; when the foldable screen assembly is in the unfolded state, the first rotating shaft and the second rotating shaft are symmetrical about the intermediate rotating shaft.

19. The foldable screen assembly of claim 11, wherein the shaft assembly further comprises a first mounting plate and a second mounting plate disposed symmetrical about the intermediate rotating shaft when the foldable screen assembly is in the unfolded state; the first mounting plate is fixed connected to the first rotating shaft and the first supporting plate, and the second mounting plate is fixed connected to the second rotating shaft and the second supporting plate.

20. A foldable screen assembly, comprising:
a shaft assembly;
a support assembly, comprising a first supporting plate and a second supporting plate rotatably coupled to the shaft assembly; the first supporting plate and the second supporting plate being rotatable along with the shaft assembly such that the foldable screen assembly is switchable between a folded state and an unfolded state; wherein when the foldable screen assembly is in the unfolded state, the support assembly is at the same level as the shaft assembly; and
a flexible display screen, comprising a first end and a second end opposite to each other and respectively located at two opposite sides of the shaft assembly; the first end being fixedly connected to the first supporting plate, and the second end being elastically coupled to the second supporting plate.

* * * * *